United States Patent
Marsal et al.

(10) Patent No.: US 7,654,078 B2
(45) Date of Patent: Feb. 2, 2010

(54) EXHAUST GAS PARTICLE COLLECTOR

(75) Inventors: Damien Marsal, Plappeville (FR); Phillipe Renaud, Sanchey (FR); Jerome Mlika, Thaon les Vogos (FR)

(73) Assignee: Honeywell International, Inc., Morristown, NJ (US)

( * ) Notice: Subject to any disclaimer, the term of this patent is extended or adjusted under 35 U.S.C. 154(b) by 59 days.

(21) Appl. No.: 11/429,880

(22) Filed: May 8, 2006

(65) Prior Publication Data

US 2007/0256411 A1   Nov. 8, 2007

(51) Int. Cl.
  *F02M 25/06* (2006.01)
(52) U.S. Cl. .............................. 60/278; 60/279; 60/297; 60/311
(58) Field of Classification Search .................. 60/278, 60/279, 297, 311, 280
  See application file for complete search history.

(56) References Cited

U.S. PATENT DOCUMENTS

| | | | |
|---|---|---|---|
| 2,289,231 A | 7/1942 | Auger et al. | |
| 3,492,980 A | 2/1970 | Beck | |
| 3,657,892 A * | 4/1972 | Perga et al. | 60/274 |
| 3,802,191 A * | 4/1974 | Fox | 60/279 |
| 3,829,235 A | 8/1974 | Murray | |
| 3,967,445 A | 7/1976 | Manfredi | |
| 4,047,912 A | 9/1977 | Markland | |
| 4,076,508 A | 2/1978 | Christensen | |
| 4,294,073 A | 10/1981 | Neff | |
| 4,316,360 A * | 2/1982 | Liu et al. | 60/275 |
| 4,419,113 A * | 12/1983 | Smith | 55/484 |
| 4,478,613 A * | 10/1984 | Brettschneider et al. | 96/61 |
| 4,535,588 A * | 8/1985 | Sato et al. | 60/286 |
| 4,619,590 A | 10/1986 | Johnson | |
| 4,673,423 A * | 6/1987 | Yumlu | 55/319 |
| 4,850,820 A | 7/1989 | Gutknecht | |
| 5,554,343 A | 9/1996 | Wade | |
| 5,904,042 A * | 5/1999 | Rohrbaugh | 60/298 |
| 5,943,864 A | 8/1999 | Sumser et al. | |
| 5,950,424 A * | 9/1999 | Nojima | 60/275 |
| 6,312,650 B1 * | 11/2001 | Frederiksen et al. | 422/180 |
| 6,532,735 B2 * | 3/2003 | Luercho | 60/278 |
| 6,598,388 B2 * | 7/2003 | Lucas et al. | 60/311 |
| 6,625,978 B1 * | 9/2003 | Eriksson et al. | 60/311 |
| 6,634,174 B2 | 10/2003 | Sumser et al. | |
| 7,296,403 B2 * | 11/2007 | Goebelbecker | 60/297 |

FOREIGN PATENT DOCUMENTS

| | | |
|---|---|---|
| EP | 0596855 (A1) | 5/1994 |
| EP | 1555421 | 7/2005 |
| FR | 2838500 | 10/2002 |
| JP | 08243333 | 9/1996 |
| WO | WO2006045488 | 5/2005 |
| WO | WO2006-024495 | 3/2006 |

\* cited by examiner

*Primary Examiner*—Thomas Denion
*Assistant Examiner*—Douglas J. Duff

(57) ABSTRACT

A particle collector includes a housing within an internal chamber having inlet and outlet ports. The housing can comprise two joined-together housing members. A collector element is disposed in the internal chamber and includes a particulate passage extending axially therethrough. A gas passageway is disposed within the chamber between a housing inside diameter and a collector element outside diameter, and is sized to produce a minimal pressure drop through the particle collector. The collector element is connected to the housing. A collection port is connected with the collector element and extends from the particulate passage to a location outside of the internal chamber for removing collected particulate matter from within the housing when the particle collector is placed into operation within an exhaust gas flow stream.

14 Claims, 4 Drawing Sheets

EXHAUST GAS PARTICLE COLLECTOR

FIELD OF THE INVENTION

This invention relates generally to the field of gasoline and diesel-powered internal combustion engine exhaust gas recirculation (EGR) systems for emission improvement and, more particularly, to device that is placed in the EGR flow path for removing particulate matter from the exhaust gas.

BACKGROUND OF THE INVENTION

EGR is a known method for reducing NOx emissions in internal combustion engines. A conventional EGR system works by taking a by-pass stream of engine exhaust gas from an engine exhaust manifold and directing it back into the engine for combustion. Typically, the exhaust gas stream is first pressurized a desired amount for injection into the engine's induction system. It is also mixed with intake air and a combustion fuel mixture for subsequent combustion. A control valve can be included in the EGR system to regulate the amount of exhaust gas that is routed to the engine induction system based on engine demand. The process of recirculating the exhaust gas insures that partially oxidized NOx exiting the engine becomes fully oxidized, thereby reducing smog producing partially oxidized NOx engine emissions.

EGR systems are used in conjunction with turbocharged gasoline and diesel-powered internal combustion engines. In such turbocharged systems, exhaust gas existing the engine is directed to a turbine housing of a turbocharger to turn a turbine wheel that is rotatably mounted therein. The exhaust gas exists the turbine housing, and an EGR bypass exhaust stream is taken for the purpose of being introduced into the engine's intake system for subsequent combustion. A control valve can be used to regulate the amount of the EGR bypass exhaust stream taken for this purpose.

The EGR exhaust stream is directed to an inlet opening of a turbocharger compressor housing that includes a compressor impeller that is rotatably disposed therein. The compressor impeller is connected to the turbine wheel via a common shaft, and is rotating from the passage of the exhaust gas through the turbine housing. As the EGR exhaust gas passes through the compressor housing the compressor impeller operates to pressurize the exhaust gas so that it exits the compressor housing at a desired boost pressure for subsequent introduction into the engine intake system, mixing with a combustion fuel mixture, and ultimately combustion within the engine.

A problem that exists with such conventional turbocharger engines comprising EGR systems relates to the introduction of the EGR exhaust gas into the compressor housing and the fact that such EGR exhaust gas flow is known to include particulate matter. The presence of such particular matter within the EGR exhaust gas flow can cause severe damage the turbocharger compressor impeller, e.g., by eroding and/or impacting the leading edges of the compressor impeller, which can reduce the performance of the compressor over time thereby reducing turbocharger efficiency and engine performance.

It is, therefore, desired that a device be constructed for use with an EGR system that is capable of minimizing and/or eliminating all together the particulate matter within an EGR exhaust gas system. It is also desirable that such device be configured to perform this function in a manner that facilitates use with a turbocharger engine system, and that further does so without creating a pressure drop within the system that could adversely impact turbocharger and engine performance.

SUMMARY OF THE INVENTION

A particle collector, constructed according to principles of this invention, for use within an exhaust gas stream includes a housing having an internal chamber disposed therein, and having an inlet port and an outlet port in gas flow communication with the internal chamber. In an example embodiment, the housing is formed from two joined-together housing members. A collector element is disposed within the internal chamber.

The collector element comprises a particulate passage that is disposed axially therethrough. In an example embodiment, the particulate passage has a conical wall surface that decreases in diameter moving axially away from the housing inlet port. The particle collector includes a gas passageway that is interposed between an outside diameter of the collector element and an inside diameter of the internal chamber to facilitate the passage of exhaust gas therethrough.

In an example embodiment, the collector element comprises tapered surfaces extending axially away in opposite directions from the passageway. The collector element can be attached to the housing by one or more flanges that extend radially outwardly therefrom and to the housing.

A collection port is connected with the collector element and extends from the particulate passage to a location outside of the internal chamber for removing collected particulate matter from within the housing. In an example embodiment, the collection port includes a section that extends through a wall surface of the housing outlet port.

Configured in this manner, when placed in an exhaust gas flow stream, the particle collector operates to collect particulate matter within the stream for removal therefrom, while at the same time facilitating gas flow passage through the collector with a minimal pressure drop. The removal of particulate matter from the exhaust gas stream minimizes or eliminates altogether to possibility of damaging a turbocharger compressor impeller positioned downstream from the particle collector, thereby maintaining desired compressor/turbocharger performance and increasing turbocharger service life.

BRIEF DESCRIPTION OF THE DRAWINGS

The invention will be more clearly understood with reference to the following drawings wherein.

DETAILED DESCRIPTION OF THE INVENTION

Figure 1:
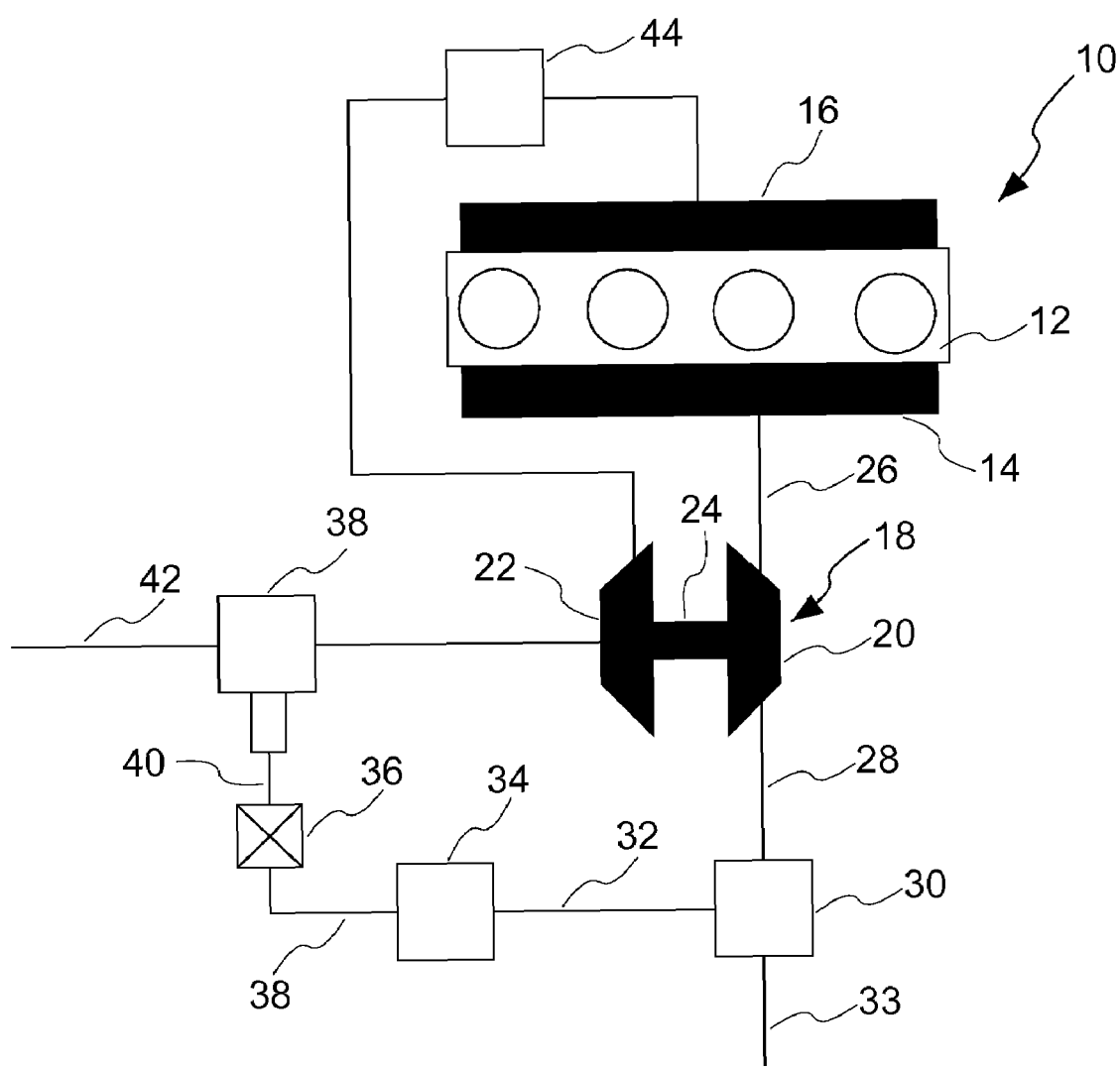
FIG. 1 is a schematic view of a turbocharged engine system comprising an EGR system including an example embodiment EGR particle collector constructed in accordance with the principles of this invention.

The invention comprises a particle collector for use within an EGR system for the purpose of removing particulate matter from a gas stream, e.g., an exhaust gas stream. The particle collector is specially constructed for in-line use within the exhaust gas stream, to remove particulate matter in a manner that results in a minimal pressure drop. In an example embodiment, particle collectors of this invention are well suited for use within an EGR system that is used in conjunction with a turbocharged internal combustion engine, e.g., upstream of the turbocharger.

FIG. Illustrates an internal combustion engine system 10 comprising an internal combustion gasoline or diesel-powered engine 12 having an exhaust system 14 including an exhaust manifold, and an intake system 16 including an intake manifold. The engine system 10 in this example embodiment is turbocharged, thus includes a turbocharger 18 having a turbine housing 20 with a turbine wheel rotatably disposed therein, and a compressor housing 22 having a compressor impeller rotatably disposed therein. The turbocharger includes a shaft 24 this is disposed within a center or bearing housing, and that is common to and attached at each end to the turbine wheel and compressor impeller.

Exhaust gas exiting the engine from the engine exhaust system 14 is directed to an inlet end of the turbocharger turbine housing 20, via a suitable exhaust pipe 26 or the like, where it operates to spin the turbine wheel, which also causes the compressor impeller in the compressor housing 22 to spin. The exhaust gas exits the turbocharger housing via an outlet positioned downstream from the turbine wheel, and is routed away from the turbocharger by a suitable exhaust pipe 28 or the like.

The engine system 10 includes an EGR system that includes flow and control devices necessary to divert a bypass stream of exhaust gas produced by the engine, e.g., exiting the turbocharger housing, back to the engine for subsequent combustion. The EGR system includes a control valve 30 that is configured and controlled to direct a desired volume or flow rate of exhaust gas, e.g., exiting the turbocharger, into a bypass pipe 32 or the like. Exhaust gas that is not directed into the exhaust bypass by the control valve is passed out of the control valve via an outlet, and is directed via a suitable exhaust pipe 33 or the like to the engine exhaust system.

In an example embodiment, the exhaust gas entering the control valve 30 is provided from the turbine housing outlet. However, it is to be understood that the source of the exhaust gas that directed to the control valve for EGR purposes can be from the engine exhaust system without first passing through the turbocharger 18. If desired, a cooler 34 can be positioned downstream from the control valve 34 in the bypass exhaust gas flow stream for the purpose of reducing the temperature of the bypass exhaust stream a desired amount.

A particle collector 36 is positioned downstream from the control valve 30 and is in gas flow communication therewith by use of a suitable bypass exhaust pipe 38. As described in greater detail below, and as better illustrated in FIGS. 2 to 4, the particle collector 36 is specially constructed to remove particulate matter from the bypass exhaust gas stream without causing an unwanted pressure drop in the system.

A mixer 38 is positioned downstream of the particle collector 36 and is connected thereto by a suitable exhaust pipe or the like 40. The mixer is configured to receive the bypass exhaust gas exiting the particle collector 36 and intake air 42 for the purpose of mixing the same together. The mixture of bypass exhaust gas and the intake air exiting the mixer 38 is then directed to the compressor impeller that is disposed within the turbocharger compressor housing 22.

The mixture is pressurized by the action of the spinning compressor impeller, and is passed through the compressor housing for combining with a fuel mixture and for introduction into the engine intake system 16 for combustion within the engine. If desired, a cooler 44 can be interposed between the turbocharger compressor housing and the engine for the purpose of reducing the temperature of the pressurized or boosted exhaust gas, air, and fuel prior to introduction of the pressurized mixture into the engine and combustion.

Figure 2:
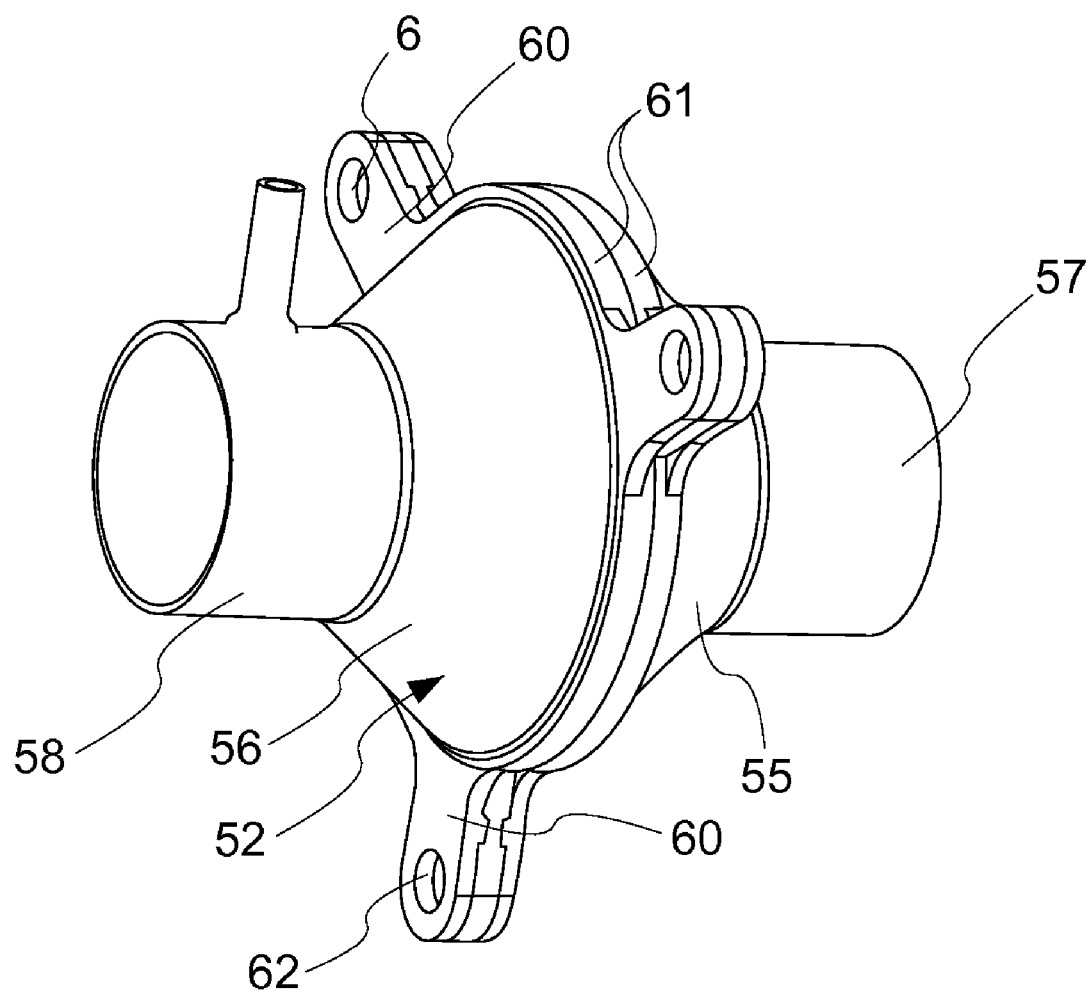
FIG. 2 is a perspective side view of an example embodiment EGR particle collector as constructed in accordance with the principles of this invention.

FIG. 2 illustrates an example embodiment particle collector 50 constructed in accordance with principles of the invention. The particle collector 50 comprises a housing 52 that in this example embodiment is formed from two separate members 55 and 56. The housing includes an inlet port 57 that extends from a first housing member 55, and an outlet port 58 that is positioned opposite the inlet port and that extends from a second housing member 56.

Figure 3:
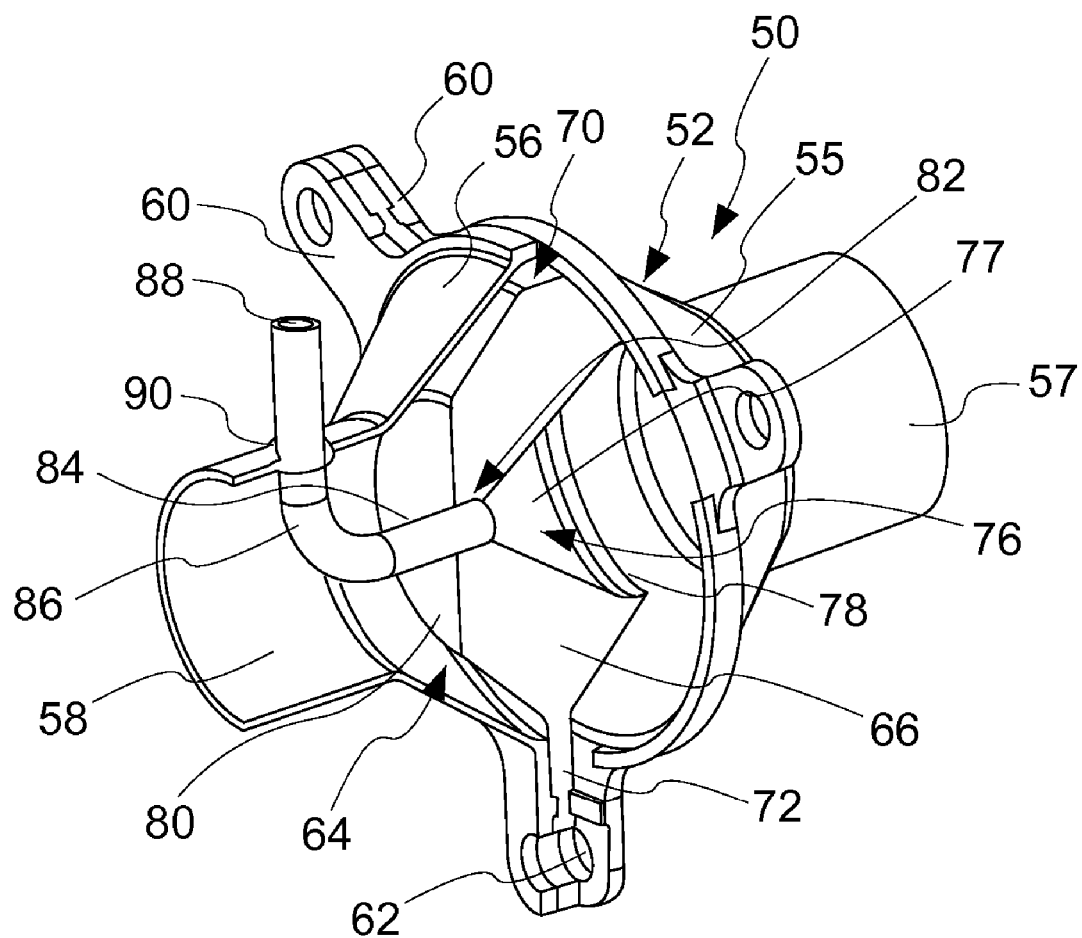
FIG. 3 is a perspective side view with cut away illustrating the example embodiment EGR particle collector of FIG. 2.
Figure 4:
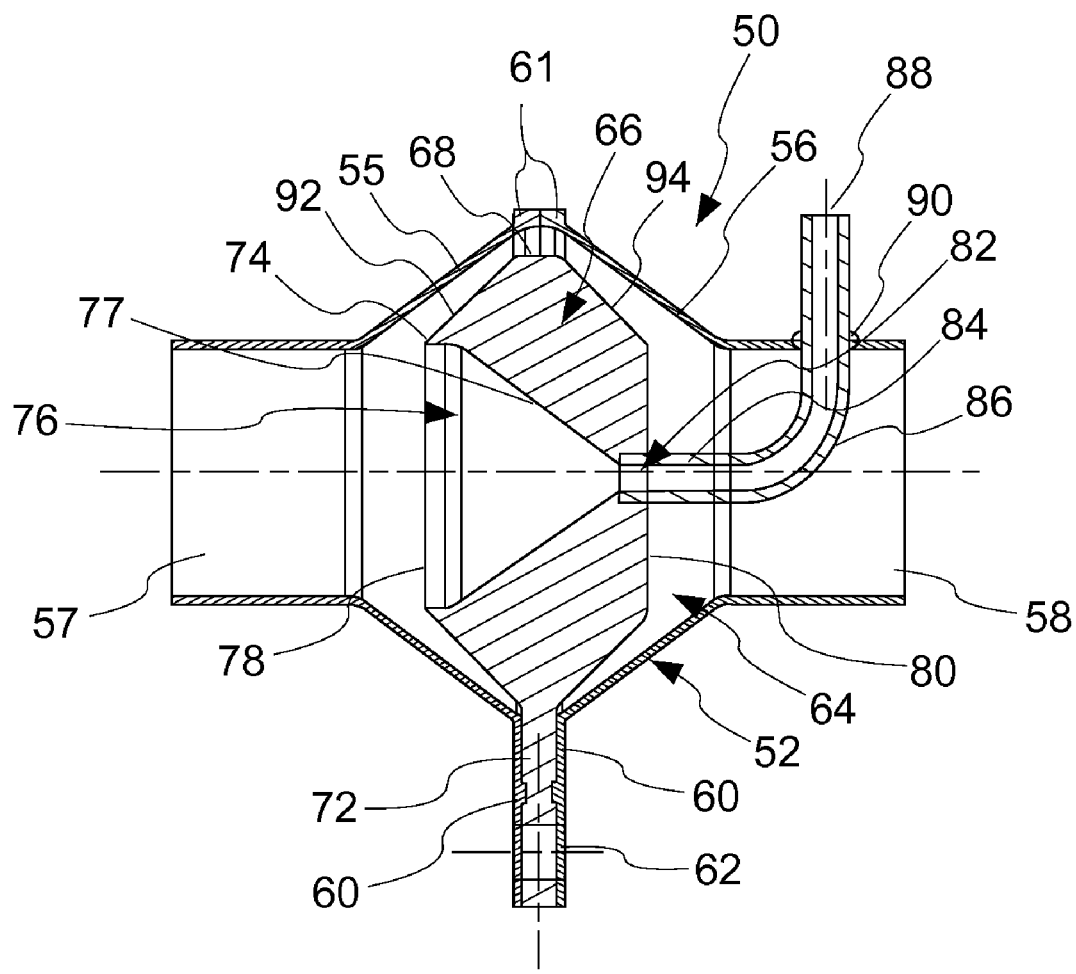
FIG. 4 is a cross-sectional side view of the EGR particle collector of FIG. 2.

The first and second housing members are sized and configured having an outside diameter that is greater than the respective inlet and outlet ports, and define an internal chamber therein (shown in FIGS. 3 and 4) that is sized and configured to accommodate a collector element (also shown in FIGS. 3 and 4). In an example embodiment, the housing members are shaped having a conical wall structure defined by an increasing outside diameter moving axially away from each respective inlet and outlet port.

In an example embodiment, the first and second housing members 55 and 56 are removably held together by conventional techniques, such as by bolted or riveted connection. In a preferred embodiment, the first and second housing members 55 and 56 each include flanged sections 60 that are positioned along a peripheral edge 62 of each member, and that extend radially outwardly therefrom. The flanged sections 60 include mounting openings 62 that extend axially therethrough for accommodating bolted attachment with one another.

The housing and housing members can be formed from conventional structurally rigid materials that are well suited for high temperature service, e.g., within the temperature range of the bypass exhaust gas, such as metallic materials. In a preferred embodiment, the housing is made from a lightweight metal such as aluminum, and can be formed by a molding or stamping process.

Referring to FIGS. 3 and 4, the particle collector 50 comprises the housing 52 made up of the housing members 55 and 56 that include the respective inlet and outlet ports 57 and 58, and the flange sections 60 with the openings 62 therethrough. An internal chamber 64 is defined within the housing members and is in gas flow communication with the inlet and outlet ports 57 and 58. The internal chamber is designed to accommodate placement of a collector element 66 therein.

The collector element 66 is specially configured to fit within the internal chamber and collect particulate matter that is within the exhaust gas entering the housing. In an example embodiment, the collector element 66 is a disk-shaped member having outer peripheral edge 68 with an outside diameter sized to fit within the internal chamber, and more specifically, within the inside diameter of the housing member peripheral edges 61. The collector element outer peripheral edge 68 is sized sufficiently smaller than the inside diameter of the housing member peripheral edges 61 for the purpose of providing an exhaust gas passageway 70 therebetween within the inner chamber. In an example embodiment, the distance between the collector outside diameter and the housing inside diameter is such that an exhaust gas passageway of sufficient size is provided so that is does not produce an unwanted pressure drop through the particle collector.

In an example embodiment, it is desired that the distance between the collector element outside diameter and the housing inside diameter be at least about 0.3 cm, and more preferably be in the range of from about 0.5 cm to 1 cm. While particular dimensions and/or tolerances for the exhaust gas passageway 70 have been disclosed, it is to be understood that the exact dimensions for this passageway can and will vary depending on the particular application, and that the dimensions noted above are provided for purpose of reference relating to one embodiment designed to function in one particular end use application. It is desired the passageway be configured so as to have sufficient dimension to ensure a desired gas flow passage through the particle collector while producing only a minimal pressure drop therethrough during operation.

The collector element 66 includes one or more flanged sections 72 that extend radially outwardly from the peripheral edge of the element and that are sized, shaped, and positioned to correspond with the flanged sections 60 of the housing members. The flanged section 72 is positioned between the housing member flanged sections to attach and fix the collector element within the housing internal chamber 64. In an example embodiment, the collector element 66 includes three flanged sections 72 that are each interposed between the corresponding housing member flanged sections 60, and that each have openings therethrough to facilitate attachment by conventional means such as by bolted attachment.

The collector element 66 includes an inlet surface 74 positioned within the housing internal chamber 64 facing the inlet port 57, such that exhaust gas entering the internal chamber is directed towards the inlet surface. The inlet surface 74 includes a particulate passage 76 disposed therein that extends axially through the collector element and that is sized and shaped to facilitate the capture and collection of particulate matter within the exhaust gas entering the housing. In an example embodiment, the particulate passage 76 is configured having a conical. shape defined by a tapered wall surface 77 having a decreasing diameter moving away from the inlet surface 74.

The particulate passage 76 includes an opening 78 at the inlet surface 74 that is sized at least the same as the housing inlet port inside diameter to ensure that particulate matter entering the internal chamber passes into the particulate passage 76 and does not bypass the particulate passage. In a preferred embodiment, the opening 78 is sized having a diameter that is greater than the inlet port inside diameter to ensure that this is the case.

The particulate passage 76 is conical in configuration to aid in the collection of particulate matter as it is passed therethough to a central collection point positioned adjacent at an outlet surface 80 of the collector element 66. In an example embodiment, the outlet surface 80 includes a central collection port 82 that is positioned adjacent an end of the particulate passage opposite the opening 78 and that extends axially therefrom and away from the outlet surface 80.

The collection port 82 is sized having an inside diameter that is similar to a reduced diameter section of the particulate passage 76, and is configured to extend away from the collector element to a position outside of the internal chamber. In a example embodiment, the collection port 82 includes a first section 84 that extends axially away from the collector element, and a second element 86 that extends radially within the housing and that includes an outlet 88 that projects outwardly therefrom. In a preferred embodiment, the collection port second element 86 extends through the housing via an opening 90 in the outlet port 58. Configured in this manner, particulate matter entering the collector element particulate passage 76 is collected as it passes therein and is passed out of the collector element and the housing via the collection port.

While FIGS. 2 to 4 illustrate the particle collector 50 oriented in a particular manner with the collection port second section 86 positioned an in upward direction, it is to be understood that orientation of the collector in these figures is only provided for purposes of illustration and reference, and are not intended to be limiting on how the particle collector may actually be oriented when attached within an EGR system. For example, it may be desirable to orient the particle collector in an EGR system with the collection port second section pointed in a downward direction, as this may aid removing the particulate matter collected within the particle collector by gravity flow.

The collector element 66 includes conical surfaces 92 and 94 having reduced diameter dimensions moving axially away from the peripheral edge 68 towards respective inlet and outlet surfaces 74 and 80. It is desired that the conical surfaces 92 and 94 be sized and shaped to facilitate the passage of exhaust gas within the internal chamber over the collector element 66 respectively to and from the exhaust gas passageway 70 to aid in minimizing unwanted pressure drop within the particle collector 50.

The collector element 66 can be made from conventional rigid structural materials that are capable of being used within the temperature range of the exhaust gas passed through the particle collector without detrimental impact. Example materials are metallic materials. In a preferred embodiment, the collector element is formed from a light-weight metal such as aluminum that can be made by a molding or machining process. The collection port 82 is also preferably formed from a light-weight metallic material such as aluminum and is connected with the collector element and the housing member by conventional methods such as by bonding, brazing, and/or welding.

Configured in this manner, when the particle collector is installed within an EGR exhaust gas bypass stream, the entering exhaust gas passes into the housing internal chamber 64 via the inlet port 57. The particulate matter within the exhaust gas is directed to the collector element inlet surface and into the particulate passage 76 where it captured and collected as it travels axially therethrough. The collected particulate matter is passed to the collection port 82 for removal from the collector element and the particle collector. The particulate matter that is removed from the exhaust gas flow and the particle collector can be treated separately and/or combined with the remaining exhaust gas generated by the internal combustion engine and passed to the exhaust system, i.e., not passed to the turbocharger.

The exhaust gas passing through the particle collector, that is now free of the particulate matter, is directed radially outwardly around the collector element via the exhaust gas passageway 70, and exits the particle collector via the outlet port 58. The particulate free exhaust gas exiting the particle collector is mixed with intake air and directed to the compressor impeller disposed within the turbocharger compressor housing, where the mixture is pressurized for subsequent introduction into the engine intake system for combustion. Since the exhaust gas being directed to the compressor impeller is now free of particulate matter, the compressor impeller will not be eroded and/or impacted, and compressor performance will not be reduced.

Having now described the invention in detail as required by the patent statutes, those skilled in the art will recognize modifications and substitutions to the specific embodiments disclosed herein. Such modifications are within the scope and intent of the present invention.

What is claimed is:

1. A particle collector for use within an exhaust gas stream comprising:

a housing having an internal chamber and having an inlet port and an outlet port in gas flow communication therewith;

a collector element disposed within the internal chamber and comprising a particulate passage disposed axially therethrough wherein the particulate passage comprises a conical wall surface that decreases in diameter moving axially away from the housing inlet port;

a gas passageway interposed between an outside diameter of the collector element and an inside diameter of the internal chamber wherein the outside diameter of the collector element and the inside diameter of the internal chamber increase and subsequently decrease, in a direction axially away from the housing inlet port toward the housing outlet port, to thereby configure the gas passageway as to have sufficient dimension to ensure a desired gas flow through the particle collector while producing a minimal pressure drop therethrough during operation of the particle collector; and a collection port that extends from the particulate passage to a location outside of the internal chamber for removing collected particulate matter from within the housing to a location outside of the housing.

2. The particle collector as recited in claim 1 wherein the collector element includes one or more flanges that extend radially therefrom and that are attached to the housing.

3. The particle collector as recited in claim 1 wherein the housing comprises two housing members, and wherein the collector element is attached between the housing members.

4. The particle collector as recited in claim 1 wherein the collection port passes outwardly from the housing through a wall section of the outlet.

5. An exhaust gas recirculation system comprising the particle collector as recited in claim 1 placed into a bypass exhaust gas stream, and wherein the particle collector is positioned upstream from a turbocharger compressor impeller.

6. A particle collector for use with an exhaust gas recirculation system for a turbocharger internal combustion engine, the particle collector being positioned upstream from the turbocharger and within a bypass exhaust gas stream, the particle collector comprising:

a housing having an internal chamber disposed therein, and having an inlet port and an outlet port in gas flow communication with the internal chamber, wherein the housing is formed from two joined-together housing members;

a collector element disposed within the internal chamber and comprising a particulate passage disposed axially therethrough, the particulate passage having a tapered wall surface with a reduced diameter moving away from the housing inlet port;

a gas passageway within the internal chamber and formed between an outside diameter of the collector element and an inside diameter of the internal chamber wherein the outside diameter of the collector element and the inside diameter of the internal chamber increase and subsequently decrease, in a direction axially away from the housing inlet port toward the housing outlet port, to thereby configure the gas passageway as to have sufficient dimension to ensure a desired gas flow through the particle collector while producing a minimal pressure drop therethrough during operation of the particle collector; and a collection port extending from a portion of the particulate passage adjacent the housing to a location outside of the internal chamber for removing collected particulate matter from the particle collector to a location outside of the housing.

7. The particle collector as recited in claim 6 wherein the collector element is attached to the housing between the two housing members.

8. The particle collector as recited in claim 6 wherein the collector element includes an opening adjacent the inlet port having a diameter that is at least as large as the inlet port inside diameter.

9. The particle collector as recited in claim 6 wherein the collection port is positioned adjacent the housing outlet port and extends radially therethrough.

10. The particle collector as recited in claim 6 wherein the housing members are joined together by one or more radially extending flange section, and wherein the collector element includes one or more radially extending flange section that is interposed between the housing member flange sections.

11. A method of making a particle collector comprising:

forming a housing comprising first and second housing members, wherein the housing includes an internal chamber having inlet and outlet ports extending therefrom;

forming a collection element comprising a particulate passage extending axially therethrough from a position adjacent an inlet surface to position adjacent an outlet surface wherein the particulate passage is configured having a tapered surface with a decreasing diameter moving axially away from the inlet surface;

attaching a collection port to the collection element adjacent the outlet surface, the collection port including a section that extends through a wall surface of the housing to a location outside of the housing; and joining the first and second housing members together, wherein the collection element is disposed within the internal chamber formed by the joined-together members, wherein the collection element is connected with the housing, wherein a gas passageway is formed between an outside diameter of the collector element and an inside diameter of the internal chamber of the housing and wherein the outside diameter of the collector element and the inside diameter of the internal chamber increase and subsequently decrease, in a direction axially away from the internal chamber inlet port toward the internal chamber outlet port, to thereby configure the gas passageway as to have sufficient dimension to ensure a desired gas flow through the particle collector while producing a minimal pressure drop therethrough during operation of the particle collector.

12. The method as recited in claim 11 wherein during the step of forming the housing, each housing member is configured having a conical inside surface that decreases in diameter moving away from respective inlet and outlet ports.

13. The method as recited in claim 11, further comprising the step of forming an opening for the particulate passage having a diameter that is at least as large as the inlet port inside diameter.

14. The method as recited in claim 11 wherein during the step of attaching, the collection port is positioned through a wall surface of the outlet port.

* * * * *